US010769347B1

(12) United States Patent
Schuermyer

(10) Patent No.: US 10,769,347 B1
(45) Date of Patent: Sep. 8, 2020

(54) PREDICTING NO-DEFECT-FOUND PHYSICAL FAILURE ANALYSIS RESULTS USING BAYESIAN INFERENCE AND GENERALIZED LINEAR MODELS

(71) Applicant: Synopsys, Inc, Mountain View, CA (US)

(72) Inventor: Christopher W. Schuermyer, Happy Valley, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/397,022

(22) Filed: Apr. 29, 2019

Related U.S. Application Data

(60) Provisional application No. 62/663,327, filed on Apr. 27, 2018.

(51) Int. Cl.
*G06F 30/398* (2020.01)
*G06N 20/00* (2019.01)
*G06F 30/27* (2020.01)
*G06F 111/20* (2020.01)

(52) U.S. Cl.
CPC ............ *G06F 30/398* (2020.01); *G06F 30/27* (2020.01); *G06N 20/00* (2019.01); *G06F 2111/20* (2020.01)

(58) Field of Classification Search
CPC ...... G06F 30/367; G06F 30/398; G06F 30/27; G06F 30/30; G06N 20/00; G06N 2111/20
USPC .......................................................... 716/112
See application file for complete search history.

(56) References Cited

U.S. PATENT DOCUMENTS

| | | | |
|---|---|---|---|
| 9,703,658 B2 | 7/2017 | Schuermyer et al. | |
| 2018/0322234 A1* | 11/2018 | Cao ...................... | G06F 30/367 |

OTHER PUBLICATIONS

Breslow, N. E., et al., article entitled "Approximate Inference in Generalized linear Mixed Models", Journal of the American Statistical Association, vol. 88, No. 421, Mar. 1993, 18 pages.
Matsunawa, Tetsuaki et al., article entitled "Optical Proximity Correction with Hierarchical Bayes Model", Proc. of SPIE vol. 9426, Apr. 7, 2015, 10 pages.

(Continued)

*Primary Examiner* — Paul Dinh
(74) *Attorney, Agent, or Firm* — Bever, Hoffman & Harms, LLP

(57) ABSTRACT

A Physical Fault Analysis (PFA) outcome prediction tool utilizes previously-generated evaluation data and associated PFA outcome data to generate a Bayesian Generalized Linear Model (BGLM), and then utilizes the BGLM to generate a PFA outcome prediction for newly-submitted evaluation data that operably characterizes measured operating characteristics of an IC chip that is being developed. The BGLM generation methodology by utilizing a Generalized Linear Model (GLM) in a Bayesian framework to form a hierarchical model representing the evaluation data and associated PFA outcome data as a linear combination. The PFA outcome prediction includes a credible interval of a posterior distribution that effectively represents a cross-sectional portion of the BGLM corresponding to the newly-submitted evaluation data. The previously-generated evaluation data and associated PFA outcome data are stored in a training data library, which is updated to include newly-submitted evaluation data and associated PFA outcome after each PFA is performed.

20 Claims, 9 Drawing Sheets

(56) References Cited

OTHER PUBLICATIONS

Matsunawa, Tetsuaki et al., article entitled "Optical Proximity Correction with Hierarchical Bayes Model", Toshiba Leading Innovation, 2015, 24 pages.

Yuan, Tao article entitled "Yield Prediction for Integrated Circuits Manufacturing Through Hierarchical Bayesian Modeling of Spatial Defects", IEEE 2011, 13 pages.

Zhang, Zhaobo et al., article entitled "Board-Level Fault Diagnosis using Bayesian Inference", 2010 28th IEEE VLSI Test Symposium, 6 pages.

Zhao, Lin et al., article entitled "Prediction of Electrical and Physical Failure Analysis Success Using Artificial Neural Networks", date unknown, 5 pages.

* cited by examiner

PREDICTING NO-DEFECT-FOUND PHYSICAL FAILURE ANALYSIS RESULTS USING BAYESIAN INFERENCE AND GENERALIZED LINEAR MODELS

RELATED APPLICATION

This application claims benefit of U.S. Provisional Application Ser. No. 62/663,327, filed on 27 Apr. 2018, by the same inventor, the contents of which are herein incorporated herein by reference in their entirety.

BACKGROUND—DISCLAIMER

In the following Background, Summary, and Detailed Description, headings should not be construed as necessarily limiting. In the following Background, Summary and Detailed Description, citation or identification of any publication does not signify relevance or status as prior art for any of the claimed or described embodiments. Paragraphs for which the text is all italicized signifies text that is common to multiple Synopsys patent specifications.

FIELD OF THE INVENTION

This disclosure generally relates to the design and fabrication of integrated circuit (IC) devices. More specifically, this disclosure relates to methods and electronic design automation (EDA) software tools utilized to perform fault analysis during a test and diagnosis phase of an IC design and fabrication process.

BACKGROUND OF THE INVENTION

Design houses are business entities that specialize in designing and supplying leading-edge IC devices (chips) to electronic device manufacturers for use in the manufacturer's products. When a manufacturer proposes a new product, each design house races to develop and present a leading-edge IC device, and then the manufacturer typically selects one of these IC devices for use in their product. Oftentimes these are winner-take-all business situations where a small number of design houses provide ICs for gaming systems, graphics processing units, bitcoin mining, central processing units, application processing units, etc. For example, new gaming consoles are typically made available by manufacturers every three years, and the design house/vendor that supplies the IC devices used inside the consoles are generally chosen once (e.g., before first product release). Because there are very few cutting-edge design houses left after widespread consolidation, the competition for leading-edge IC devices is extremely high. That is, the inability of a design house to provide the necessary volumes of IC devices before their competitors can result in market window closing, and it can be several years before the window is open again. In view of this extreme competition, the commercial success of a design house is significantly determined by its ability to minimize the associated IC development process timeline, which has shrunk from about two years in the recent past to a year or less in some current cases.

The IC development process generally includes a design/development phase during which an initial conception is converted into a taped-out circuit design, and a process ramp phase during which a fabrication process is developed that is capable of volume production (i.e., fabrication of IC chips at a manufacturer's required rate). The design/development phase typically involves converting an initial concept into a logical IC design, which is then taped-out (i.e., converted into a corresponding series of masks), and the process ramp phase involves utilizing the masks in a selected fabrication process (node) to produce physical IC chips. The process ramp phase typically includes performing a fabrication run to produce a small number of the target IC devices (sometimes referred to as test chips), a test and diagnosis phase during which fault analysis is performed on the test chips to identify any faults or failures, and then modifying either the circuit design or the fabrication process to correct the faults/failures. This cycle is repeated until all faults/failures have been detected and corrected, at which point volume production of IC devices may be undertaken.

An undesirably prolonged IC development process timeline is typically caused by delays experienced during the process ramp phase. As mentioned above, any delay introduced in either the design/development or process ramp phases can have a significant impact to the design house's profitability. In practice, prolonged IC development process timelines typically occur due to delays in completing fault analysis, not during design/process phase. Fault analysis typically involves performing three kinds of tests: 1) parametric tests to check electrical characteristics (voltage, current, power consumption), 2) dynamic tests to check response times under nominal operating conditions, and 3) functional tests to check logical behavior. When a fault/failure is detected during the fault analysis process, the fault analysis team must identify the associated cause and implement corrective action. This process is performed for each detected fault/failure until fault-free chips are reliably produced by the associated fabrication process. When the number of detected faults/failures is small and the associated causes are quickly identified and corrected, the process ramp phase can be performed in a reasonable amount of time, thereby minimizing the IC development process timeline. Conversely, undesirably long IC development process timelines occur when a large number of faults/failures are detected, and/or the causes of some of the faults/failures cannot be easily identified. Because a failure to quickly identify and correct fault/failure causes can significantly delay production on a commercial scale, there is a need for methods and tools that facilitate efficient fault analysis.

When a fault (i.e., an undesirable operating characteristic) is detected during fault analysis, an associated fault/failure cause is identified and classified as being a design-based fault or a physical fault. The causes of faults/failures in test chips can be generally divided into two classes: physical faults caused by erroneous or improper fabrication processes, and design faults that are caused by errors in the circuit design. Design-based faults are caused by errors in the circuit design and can be identified and corrected by the design house. On the other hand, to understand the root cause of fault/failures caused by the fabrication process it is common to employ the Physical Failure Analysis (PFA) process, which is typically performed by the chip fabrication facility and involves identifying the physical mechanisms that are causing the chip failure through a destructive process (i.e., cutting the chip into pieces/slices and analyzing the chip's physical characteristics). The goal of PFA is generally to identify all physical defects that are unintentionally introduced due to corresponding flaws in the manufacturing process. Fabrication processes (flows) utilized to manufacturing IC devices are imperfect process and fabrication facilities are continuously working to improve the fabrication process utilized to produce IC devices. By way of performing several of these PFA tasks a trend can be discerned that indicates something systematically wrong in the fabrication process. This information is fed back to the manufacturing (e.g., design and fabrication) groups to resolve the issue and improve the manufacturing process.

One of the main challenges associated with implementing the PFA process is resolving cases where no root cause (i.e., process or other physical flaw) is identified. These cases are referred to by various entities using various names and acronyms such as No Defect Found (NDF), No Visual Defect (NVD), etc. PFA processes resulting in NDF outcomes are extremely costly for several reasons. First, an NDF result means there is no action that can be taken to improve the process. The corresponding inaction while awaiting PFA results delays the test and diagnosis process, which in turn has a compound cost in terms of delayed process ramp and continued low yield in the process. A delay in the process ramp for the manufacturer can in turn introduce a delay in supply to their end customer which can cause a delayed product release. A second reason NDF outcomes are costly is the high cost required to perform the PFA process. A third reason involves poor perceived performance of the failure analyst; a failure analyst's technical ability is generally graded based on their number of successful cases, whereby each NDF result negatively impacts their personal performance metric. A fourth reason is that biased process learning, which can result from focusing manufacturing improvements on only the successful PFA processes (i.e., PFA processes that yield process/physical failure causes). Just because an issue can't be visually seen doesn't mean it's not still impacting the manufacturing process. Inefficiency in the chosen technique for conducting the PFA. Some defects can only be identified using relatively expensive techniques. Traditionally PFA is done with the least expensive technique, visual inspection, and this can result in an NDF outcome if the defect is non-visual in the first place.

To reduce the number of NDF PFA outcomes, and thereby decrease IC development process timelines, the semiconductor industry needs to change the most basic question that is asked—that is, rather than 'what defect is this?', the first question to be asked should be 'am I going to find a physical defect, and if not why?'. Reframing this initial question will eliminate the wasted effort involved in an NDF outcome, and additionally it will focus the investigation on the metrics that are correlated to the NDF outcome.

To improve the efficiency of utilizing the PFA process there are a number of requirements that need to be satisfied. First, the ability to report the estimated probability of an NDF (or non-NDF) outcome; this value can be used to decide whether to conduct a PFA job, change the PFA techniques that will be applied, or assign different people to the task. Second, the uncertainty associated with the outcome; if the value is 50% plus-or-minus 50%, then the information cannot be considered as informative. Third, the ability to incorporate prior knowledge into the prediction; for example, there is a baseline number of NDF cases that is known by the PFA lab and this number can be used to improve the model accuracy without actually bringing in every individual PFA case for all history. Fourth, the ability to deal with 'fat data', which is data that has many more predictors than observations; the number of PFA jobs that can be used to train a model, can be in the single or double digits, and the number of predictors can potentially be hundreds.

In order to minimize the IC device development process timeline it is critical that a PFA outcome prediction model can be 'queried', so that a reason for an individual NDF prediction can be reported. This way, even if performing a PFA turns out to be the wrong approach (i.e., no physical failure cause is found), the PFA process still provides useful information that can help a fab or design house understand the root cause of an IC device's manufacturing problem.

In addition to reducing IC development process timelines, there is also a need for EDA software tools that allow design houses to protect proprietary test and diagnosis solutions. That is, as set forth above, the commercial success or failure of an IC device can be determined by a small reductions in addressing faults detected during the test and diagnosis process, so design houses often expend significant time and resources developing their fault analysis teams so that their reduced IC development process timelines give their IC devices a competitive advantage over those of their competitors. Accordingly, these design houses have a strong interest in maintaining (e.g., by way of trade secret) their proprietary fault analysis solutions to both recover the associated development costs, and to prevent competitors from unjustly benefitting from their development efforts.

What is needed is an EDA software tool capable of predicting whether PFA is needed to successfully resolve an IC device fault/failure that is identified during testing and diagnosis, thereby minimizing IC development processes by avoiding lengthy PFA processes when physical failure causes cannot be found.

SUMMARY OF THE INVENTION

The present invention is directed to a method/tool for predicting Physical Failure Analysis (PFA) outcomes (i.e., either No-Defect-Found (NDF) or Defect-Found (non-NDF)) using a Bayesian Generalized Linear Model (BGLM).

Each BGLM is generated using a combination of Bayesian inference and Generalized Linear Model (GLM) techniques and trained using observed data stored in a training data library. Specifically, the observed data (training data entries) utilized to generate/train each BGLM includes previously-generated (first) evaluation data generated during test and diagnosis performed after each fabrication run, and associated PFA outcome data (i.e., either an NDF "1" value or a non-NDF "0" value) generated by previously conducted PFA processes for the IC devices produced by associated fabrication runs. Bayesian inference is an applied statistics technique that is used to describe a process that generates observed data and to explain how well the model fits the data. One advantage of using a Bayesian inference approach to predicting PFA outcomes is that it can incorporate the overall historical PFA NDF-prediction accuracy rate of a design house's failure analysis team (i.e., by including data from both NDF outcome data and non-NDF outcome data in the BLGM). A Generalized Linear Model (GLM) provides a way to describe the process that generates the observed data (in this case, PFA outcomes) based on some linear predictor input data (data that is collected about a population of integrated circuits). A major advantage of combining GLMs and Bayesian inference is the ability to linearly add hierarchical data (e.g., which failure analyst is being assigned to a PFA job) to make the BGLMs highly interpretable by a fault analyst, which allows a design house to identify the model predictors that most significantly affect the PFA outcomes, and work to reduce the occurrence of these items. By combining the Bayesian inference and GLM techniques, BGLM produced in accordance with the present invention are characterized by treating variables as a range of probability distributions instead of values, whereby each BGLM can be thought of as a continuous range of posterior distributions represented as, for example, a two-dimensional surface (sheet) disposed in a three-dimensional volume defined by a first axis corresponding to the evaluation data values, a second axis corresponding to the posterior probability of finding a physical defect, and a third axis corresponding to a probability density generated by Bayesian inference. With this approach, each BGLM effectively captures uncertainty in the evaluation data.

According to another aspect of the invention, each BGLM generated as set forth above is then utilized to generate a PFA outcome prediction by way of utilizing currently-generated (second) evaluation data, which operably characterizes measured operating characteristics of a corresponding "new" (second) IC device/chip. The currently-generated evaluation data is applied as an explanatory variable value to the BGLM in a manner that is relative to the previously-generated (first) evaluation data, and the resulting PFA outcome prediction is effectively defined by a posterior distribution and/or a credible interval, where the posterior distribution can be described as a cross-sectional linear portion of the BGLM taken at a point defined by the evaluation data value, and the credible interval is a partial (e.g., 80%) certainty region defined by the posterior distribution. By providing the PFA outcome prediction in this manner, the combined use of Bayesian inference and GLM principles provides a novel improvement in the technical field of fault analysis by way of providing an estimated probability that a PFA process applied to the current IC device will generate an NDF (or non-NDF) PFA outcome. That is, the present invention provides PFA outcome predictions in a way that greatly improves the test and diagnosis phase of the IC development by providing prediction data that facilitates informed decisions regarding whether a PFA process will find a physical fault/failure. A benefit of generating PFA outcome predictions using the methodology of the present invention is that these PFA outcome predictions make it substantially easier for circuit designers to predict successful PFA outcomes in light of the increasing number of design problems that are surfacing in physical IC devices (chips) during the test and diagnosis phase of the IC design and development process. It is increasingly common that the reason for NDF PFA outcome results is that the actual failure cause is a design flaw (i.e., there is no physical flaw). For example, with the hundreds of possible timing sign-off corners in a modern IC, it is possible that there are some failures due to timing exceptions. In these cases a PFA analyst may identify a minor irregularity as a physical defect in order to avoid entering an NDF result, where the physical defect could be unrelated to the actual failure cause, which could precipitate adopting the wrong corrective action for the issue, thus generating an unnecessary delay in time-to-market for the associated IC device. By way of implementing the PFA outcome prediction methodology of the present invention, the prediction results would allow a design house to more easily identify the failure cause as a timing exception, not a fabrication error, whereby, thereby avoiding the unnecessary costly PFA process and minimizing time-to-market by way of implementing an efficient corrective action that addresses the timing issue.

According to a presently preferred embodiment, the training data library is updated to include both the original (first) training data entries and a new (second) training data entry comprising the currently-generated (second) evaluation data and a corresponding (second) physical failure analysis result data that operably characterizes results of a corresponding PFA process performed on the "new" IC device/chip. That is, the training data library is only updated when a decision is made to request a PFA process based on an associated PFA outcome prediction and is performed after the corresponding PFA results are provided by the fabrication facility that performs the PFA process. In this way, each BGLM is generated using actual PFA outcome data, whether a physical fault is found or not, whereby each successively generated BGLM becomes more credible as more training data is acquired and exhibits model parameters that can be shared across different technologies and IC devices.

In addition to the above-mentioned benefits and commercial advantages stemming from significantly shorter IC development process timelines, because development of each BGLM is entirely performed within a user's secure computer system/network, the user is also able to prevent competitors from unjustifiably benefitting from the time and resource invest spent by the user on developing the user' proprietary optimization strategy.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure. In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

DETAILED DESCRIPTION OF THE DRAWINGS

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary innovations, embodiments and/or examples. In the interest of not obscuring the presentation of the exemplary innovations, embodiments and/or examples in the following Detailed Description, some processing steps or operations that are known in the art may have been combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. The following description is instead focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 1:
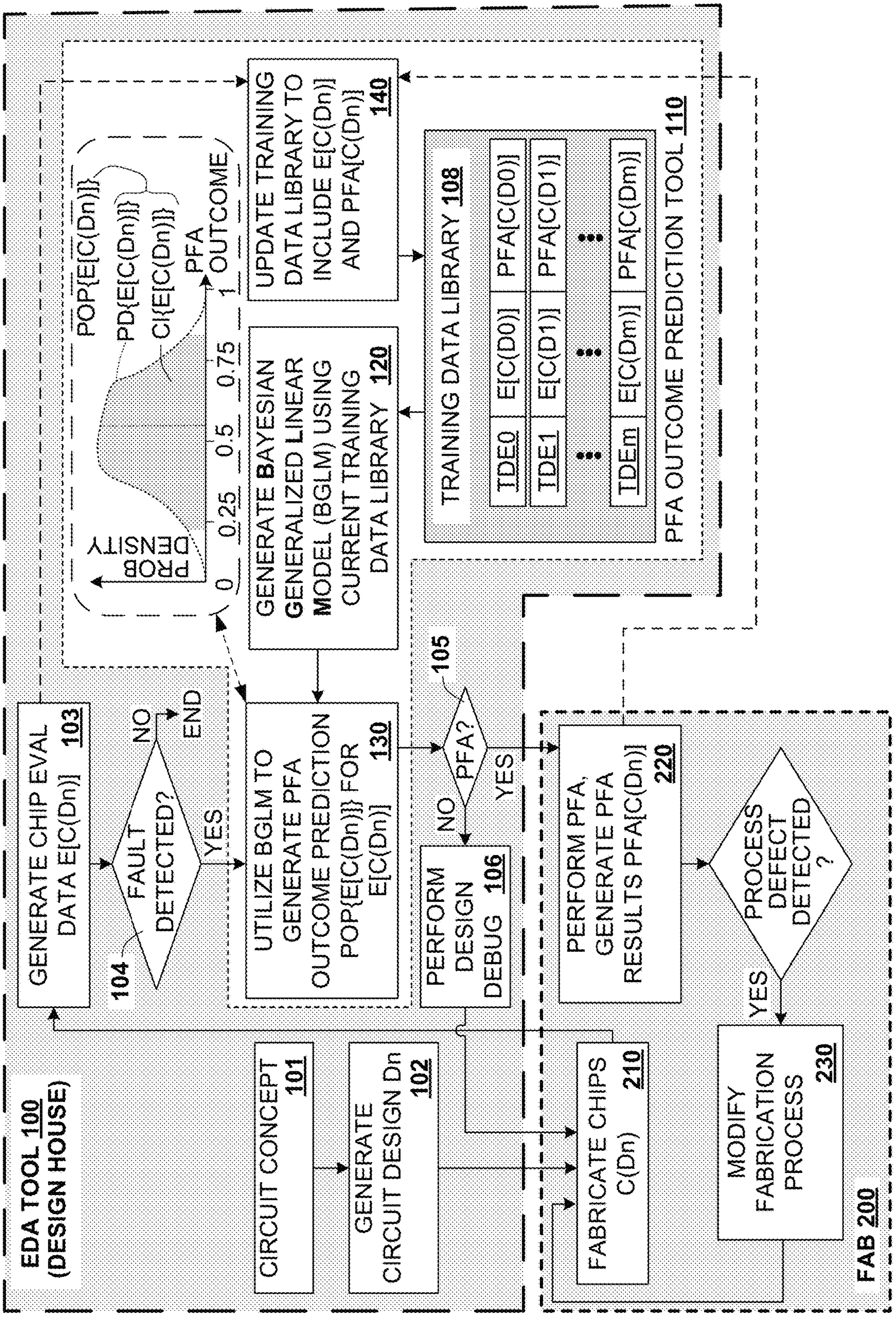
FIG. 1 is a flow diagram depicting a PFA prediction tool methodology utilized in accordance with a generalized embodiment of the present invention.

FIG. 1 is a flow diagram depicting a generalized IC design and fabrication process that utilizes a PFA prediction tool 110 in accordance with an exemplary embodiment of the present invention. In this example, PFA prediction tool 110 is implemented as part of an EDA tool 100 that is controlled by an IC design entity (design house) and is applied to physical IC devices produced by a semiconductor fabrication facility ("FAB") 200.

Referring to the upper left portion of FIG. 1, the generalized IC design and fabrication process performed by EDA tool 100 begins with an IC (circuit) concept (block 101) that is then converted into a current circuit design (e.g., circuit design Dn, referenced in block 102), which is then transferred to fabrication facility 200. The various stages typically implemented during conversion of the concept into a "taped-out" version of circuit design Dn that is suitable for fabrication are described below. Fab 200 then utilizes the taped-out version of circuit design C(Dn) to generate one or more physical IC devices C(Dn) (block 210), and IC devices C(Dn) are then returned to the design house for evaluation during a test and diagnosis phase of the associated IC design and fabrication process (block 103). Note that multiple IC devices may be transported together on a wafer for test and diagnosis, or may be transported individually by way of dicing the wafer into individual IC device "chips"—for convenience, IC devices in both wafer and chip form are sometimes referred to herein as IC chips. Evaluation data E[C(Dn)] generated by a corresponding toolsteps (i.e., programs/applications forming distinct portions of EDA tool 100) during the test and diagnosis phase is then analyzed to determine whether chips C(Dn) include one or more faults or failures (block 104). If evaluation data E[C(Dn)] indicates faults/failures exist in chips C(Dn), then evaluation data E[C(Dn)] is submitted to PFA outcome prediction tool 110 for generation of a PFA outcome prediction POP{E[C(Dn)]} as described in detail below. The design house then decides, based on PFA outcome prediction POP{E[C(Dn)]}, whether to request a PFA process 220 (YES branch from decision block 105) or to perform a design debug process 106 (NO branch form decision block 105), whereby corrective action(s) are performed and modifications are made to one or both of circuit design Dn or to the fabrication process utilized in block 210 or in how the IC is tested. After the corrective action(s) are implemented, fabrication facility generates a "new" IC chip (i.e., block 210 is repeated) which is then subjected to test and diagnosis (i.e., block 103 is repeated). A loop is thus established between chip fabrication (block 210), chip evaluation (block 103), PFA outcome prediction (block 110) and either design debug (block 106) or PFA processing (block 220) until no faults are identified in decision block 104, at which point the test and diagnosis process is completed and IC devices C(Dn) are ready for full-scale production.

Referring to the upper right portion of FIG. 1, PFA prediction tool 110 functions to generate a PFA outcome prediction after each chip evaluation. For example, PFA prediction tool 110 is called after evaluation data E[C(Dn)] is generated for "new" IC chip C(Dn) in block 103 and one or more faults are detected in block 104. PFA prediction tool 110 is executed by a processor of a computer (not shown) and performs a method including generating a Bayesian generalized linear model BGLM-A (block 120) using the techniques described below, and then utilizing the generated model BGLM-A to generate a PFA outcome prediction POP{E[C(Dn)]} for IC device/chip C(Dn) based on evaluation data E[C(Dn)].

As indicated below block 120, PFA prediction tool 110 generates BGLM-A using training data stored in a training data library 108, which may be part of tool 110 or stored in a separate database controlled by the design house. In the depicted embodiment, training data library 108 includes previously-generated (first) training data entries TDE0 to TDEm, where each first training data entry includes corresponding first evaluation data that operably characterizes measured operating characteristics of a corresponding (first) IC device, and corresponding (first) PFA result data that operably characterizes results of a corresponding physical failure analysis of the corresponding IC device. For example, training data entry TDE0 includes evaluation data E[C(D0)] and PFA result data PFA[C(D0)], where evaluation data E[C(D0)] characterizes measured operating characteristics of a corresponding IC device (chip) C(D0), and PFA result data PFA[C(D0)] indicates whether a physical fault was determined during a corresponding physical failure analysis session involving IC chip C(D0). Similarly, training data entry TDE1 includes evaluation data E[C(D1)] and PFA result data PFA[C(D1)], where evaluation data E[C(D1)] characterizes measured operating characteristics of a corresponding IC device (chip) C(D1), and PFA result data PFA[C(D1)] indicates whether a physical fault was determined during a corresponding physical failure analysis session involving IC chip C(D1).

As indicated to the left of block 120, PFA prediction tool 110 then utilizes BGLM-A to generate a PFA outcome prediction POP{E[C(Dn)]} for newly-submitted (second) evaluation data E[C(Dn)]. As indicated in the bubble located above block 120 in FIG. 1, PFA outcome prediction POP{E[C(Dn)]} includes one or both of a posterior distribution PD{E[C(Dn)]} and a credible interval CI{E[C(Dn)]}, where posterior distribution PD{E[C(Dn)]} is a portion of BGLM-A that corresponds with evaluation data E[C(Dn)], and credible interval CI{E[C(Dn)]} is a partial (e.g., 80%) certainty region defined by posterior distribution PD{E[C(Dn)]}. The generation and composition of PFA outcome prediction POP{E[C(Dn)]} is described in additional detail below.

Figure 2:
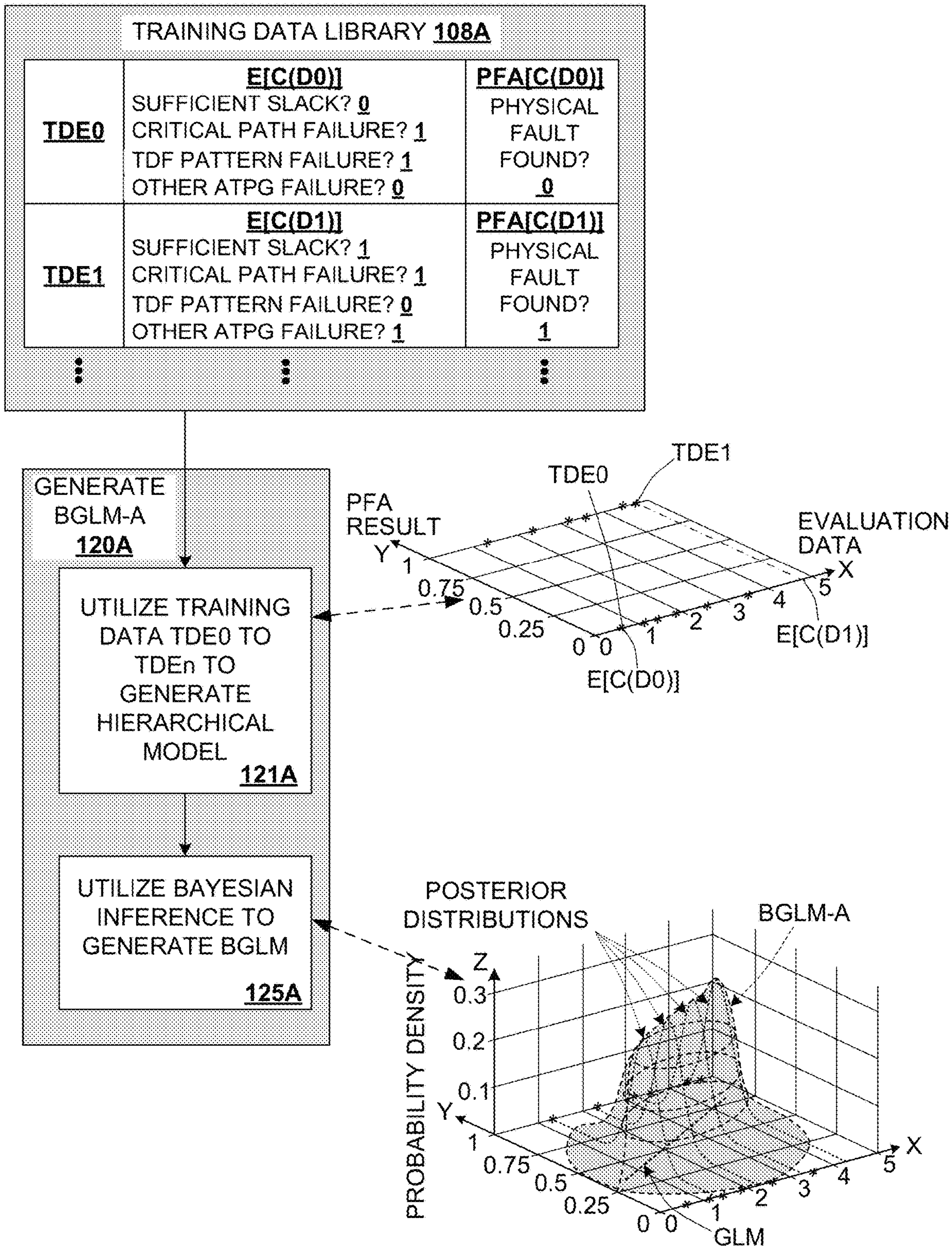
FIG. 2 is a diagram depicting the generation of a BGLM using the methodology of FIG. 1 using a simplified training data library according to an exemplary embodiment.

FIG. 2 is a flow diagram showing the generation of a BGLM using exemplary training data stored in a training data library 108A. In this case, each training data entry includes various observed (evaluation data) parameters that are stored using corresponding binary values (e.g., a bit value "0" indicates that insufficient slack was provided in a circuit design, and a bit value "1" indicates that sufficient slack was provided in the circuit design). Similarly, the PFA outcome data for each training data entry is stored as a binary value (e.g., PFA outcome data value "0" assigned to entry TDE0 indicates that the associated PFA process for associated IC device C(D0) resulted in NDF, and PFA outcome data value "1" assigned to entry TDE1 indicates that the associated PFA process for associated IC device C(D1) resulted in a non-NDF result). As indicated in block 120A, the generation of Bayesian Generalized Linear Model BGLM-A involves utilizing the evaluation data (e.g., data E[C(D0)] and corresponding PFA outcome data (e.g., data PFA[C(D0)] and PFA[C(D1)]) to generate a hierarchical model (block 121A), and utilizes Bayesian inference to generate Hierarchical Bayesian Generalized Linear Model BGLM-A (block 125A). In other words, the method generates BGLM-A based on a Generalized Linear Model (GLM) in a Bayesian framework to form a hierarchical model, and utilizes the evaluation data (e.g., data E[C(D0)] and E[C(D1)]) and the associated PFA outcome data (e.g., data PFA[C(D0)] and PFA[C(D1)]) as a linear combination such that model BGLM-A provides a continuous range of posterior distributions that vary as a function of the first evaluation data. As indicated in the lower right portion of FIG. 2, BGLM-A is represented as, for example, a two-dimensional surface that is bent into a three-dimensional space in a manner similar to draping a sheet over a hat-shaped framework, where the three dimensions include evaluation data value (X-axis), which are normalized for brevity, posterior probability of finding a physical defect (Y-axis), and probability density (Z-axis). Exemplary posterior distributions are indicated by dotted-line curved lines, and can be thought of as ribs of the framework that extend in corresponding X-Z planes and support the 'sheet-like' surface that defines BGLM-A.

Figure 3:
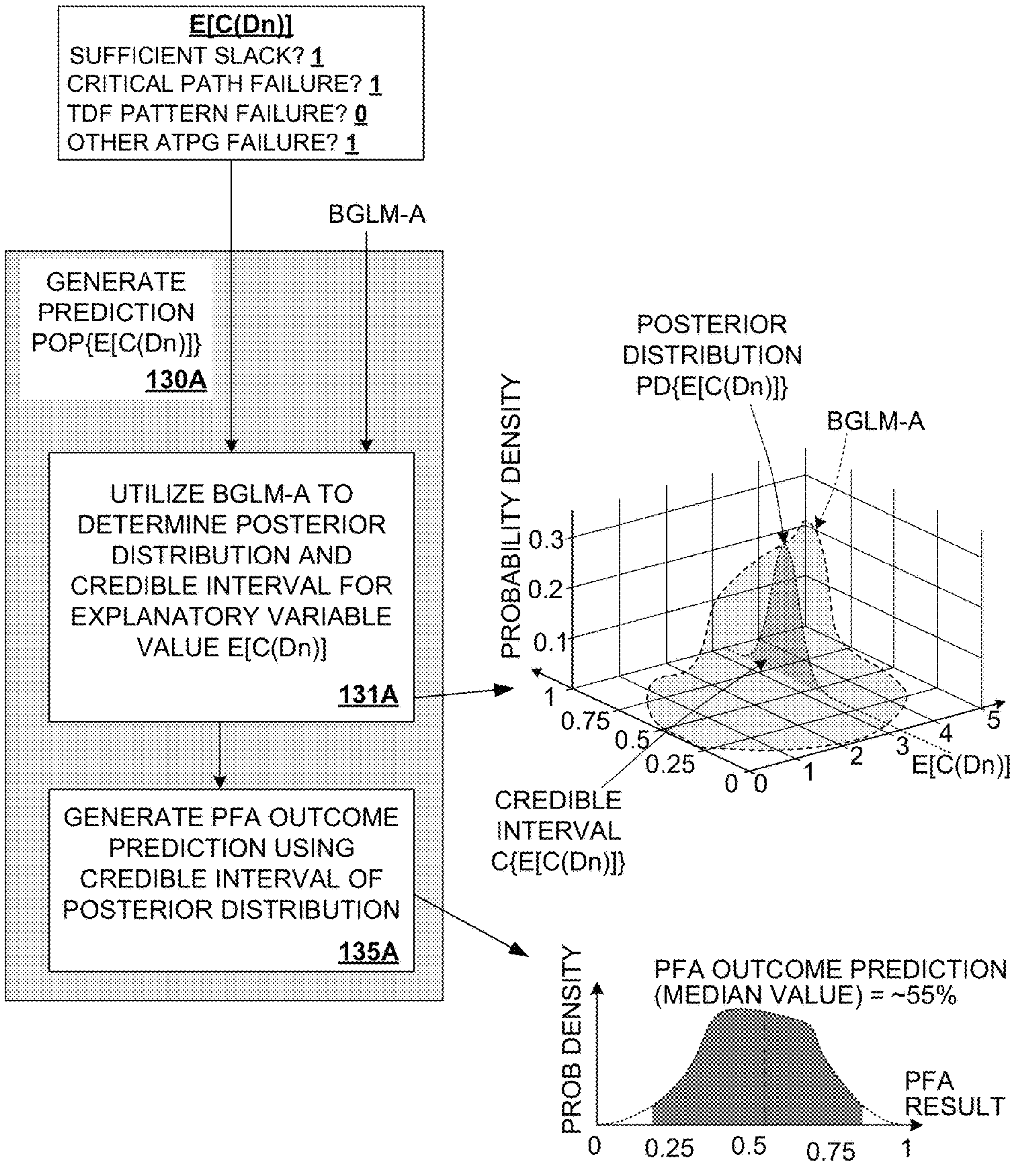
FIG. 3 is a diagram depicting the generation of a PFA outcome prediction using the BGLM of FIG. 2 according to another exemplary embodiment.

FIG. 3 depicts the generation of exemplary PFA outcome prediction POP{E[C(Dn)]}. As indicated at the top of FIG. 3, evaluation data E[C(Dn)] includes parameters that are identical to those used to generate model BGLM-A, so utilizing model BGLM-A to generate PFA outcome prediction POP{E[C(Dn)]} involves utilizing newly-submitted evaluation data E[C(Dn)] to identify (select) a corresponding posterior distribution PD{E[C(Dn)]} from the range of posterior distributions that define model BGLM-A (block 131A). That is, evaluation data E[C(Dn)] is utilized as an explanatory variable that effectively determines the X-Z plane at which corresponding posterior distribution PD{E[C(Dn)]} is defined by model BGLM-A. According to a presently preferred embodiment, the generation of PFA outcome prediction POP{E[C(Dn)]} involves calculating a credible interval CI{E[C(Dn)]} using a predetermined portion (e.g., 80%) portion of posterior distribution PD{E[C(Dn)]} (block 135A).

Referring again to FIG. 1, according to a presently preferred embodiment training data library 108 is updated (block 140) to include, in addition to already-stored (first) training data entries TDE0 to TDEM, the 'new' (second) training data entry TDEn including evaluation data E[C(Dn)] that was generated in block 103, and a corresponding (second) PFA outcome (result) data PFA[C(Dn)], which operably characterizes results of a corresponding PFA process performed on IC device/chip C(Dn) by fab 200 in block 220. That is, training data library 108 is only updated when a decision is made to request a PFA process based on associated PFA outcome prediction e.g., POP{E[C(Dn)]}, and the update operation is performed after the corresponding PFA results are provided by fab 200.

Figure 4:
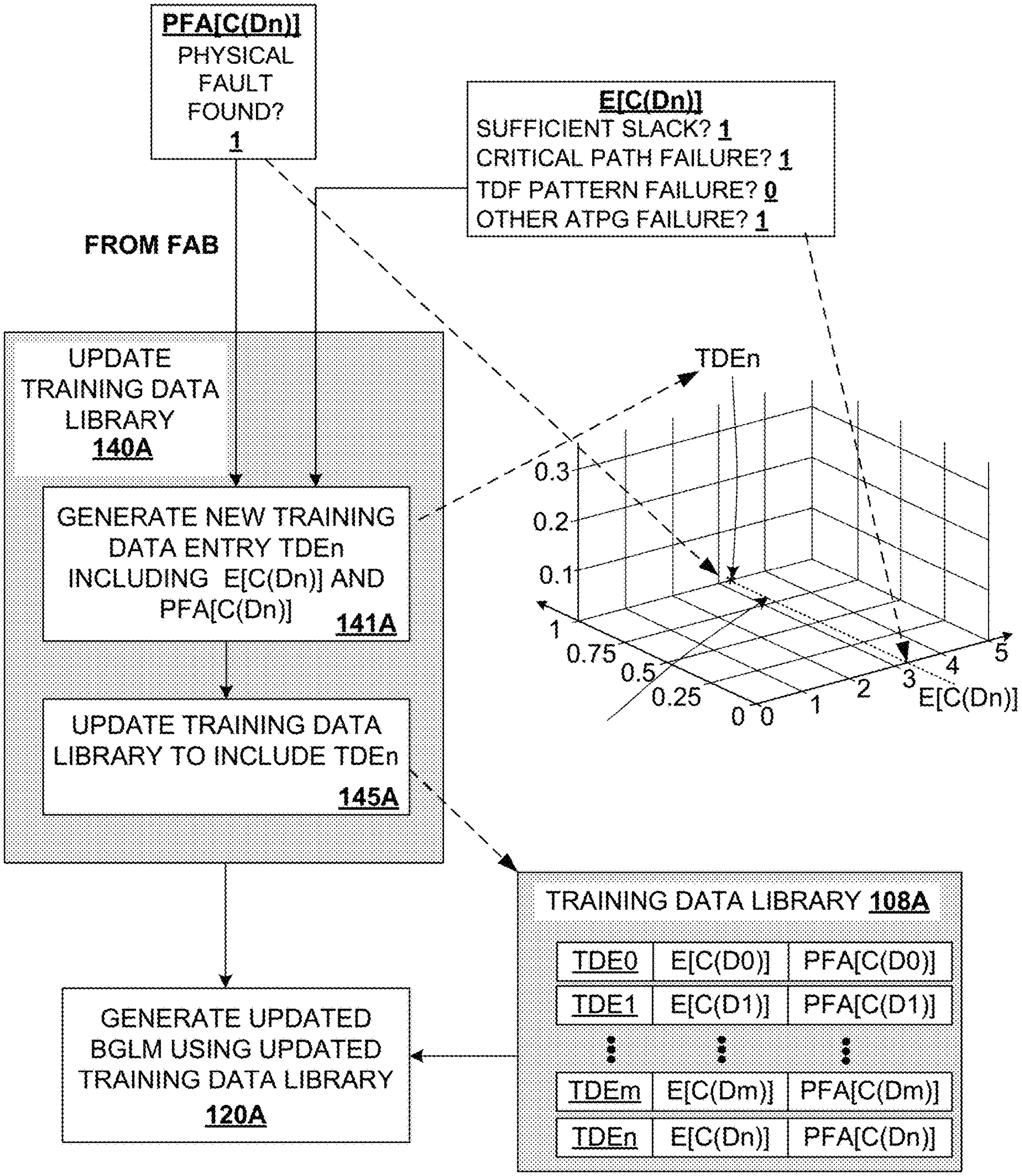
FIG. 4 is a diagram depicting updating the training data library utilized to generate the BGLM using PFA outcome results generated by an associated PFA process.

FIG. 4 is a flow diagram depicting the training table library update process in additional detail, with exemplary values for evaluation data E[C(Dn)] and PFA outcome data PFA[C(Dn)] indicated on a graph similar to that used in FIG. 2 to depict the generation of model BGLM-A. Note that the depicted values are arbitrarily selected. These two values are combined to from training data entry TDEn (block 141A) which is added to training data library 108A (block 145A). Updated training data library 108A is depicted at the bottom of FIG. 4, and is subsequently utilized to generate an updated BGLM (block 120A). In this way, each BGLM is generated using actual PFA outcome data, whether a physical fault is found or not, whereby each successively generated BGLM becomes more accurate as more training data is acquired and exhibits model parameters that can be shared across different technologies and IC devices.

Figure 5:
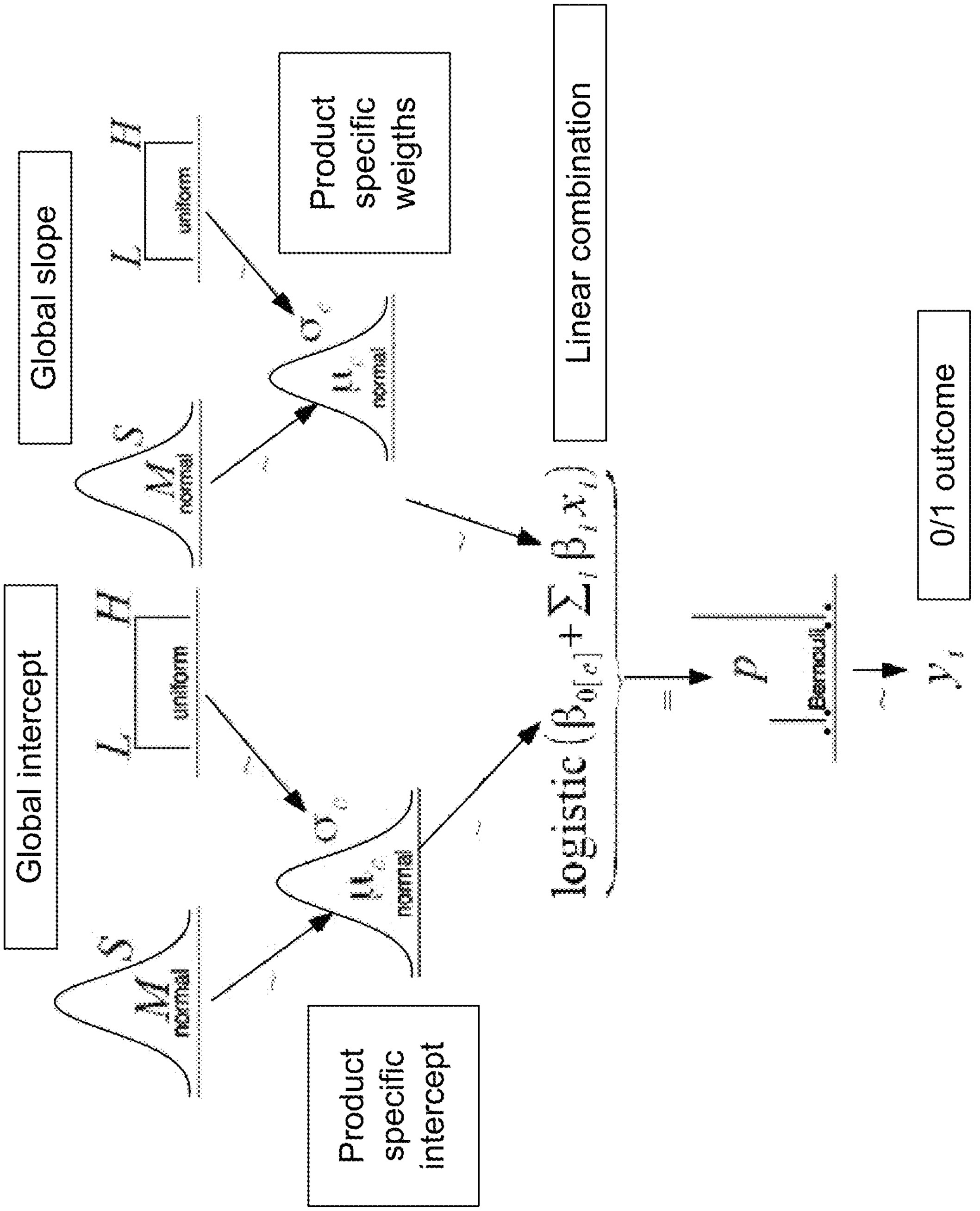
FIG. 5 is a flow diagram depicting the generation of a Hierarchical Bayesian Generalized Linear Model with varying intercept and slope values according to an exemplary embodiment.

FIG. 5 is a flow diagram showing a BGLM generative process according to a specific embodiment. In this diagram, the observed value 'y' is the result from the associated PFA process. Each observed IC device is represented by the subscript 'i'. The "0" or "1" outcome prediction can be made from a random draw from a Bernoulli distribution. The rate parameter of the Bernoulli distribution is estimated with a logistic link function applied to a linear equation. This combination of link function and linear equation makes the model a GLM. The linear equation contains an intercept parameter and slope parameters shown as 'β'. Each slope parameter is multiplied by its respective predictor 'x'. Each of the R parameters are themselves drawn from a prior distribution, shown as a normal distribution with two parameters in FIG. 5 (i.e., mean 'μ' (mu) and standard deviation 'σ' (sigma)). This prior distribution on the parameters is what makes the model a Bayesian GLM. These are product specific parameters which are themselves drawn from a technology prior. This second level of priors is what makes the model a Hierarchical Bayesian GLM.

The following paragraphs provide background regarding the various core concepts utilized by the present invention.

Bayesian Inference: Bayesian inference is a type of statistical inference that is used to estimate the probability of a model based on observational data. It's so named because it uses Bayes' theorem to infer these probabilities. There are many advantages of a Bayesian inference approach that makes it well suited to the problem of predicting No Defect Found outcomes in PFA.

Bayesian inference follows from the application Bayes' theorem, which can be expressed as Equation 1:

$$P(\theta \mid D) = \frac{P(D \mid \theta)P(\theta)}{P(D)} \quad \text{Equation 1}$$

where: P(θ|D) represents a posterior distribution, P(D|θ) is a likelihood function, P(θ) represent a prior, and P(D) represents evidence (input data). The actual application of Bayesian inference follows from the facts that the evidence can be treated as a constant, the data is made up of observations and predictors, and the predictors are independent variables, which facilitates expressing Bayesian inference as indicated in Equation 2:

$$P(\theta|y,x) \propto P(y|\theta,x)P(\theta,x) \quad \text{Equation 2:}$$

The goal of Bayesian inference is to use this relationship to estimate the model parameters θ that best map the product of the likelihood and prior to the posterior distribution given the input data. Unlike typical statistical inference techniques like expectation maximization, Bayesian inference treats parameters as random values being drawn from a statistical distribution. This enables the incorporation of prior information regarding the parameters, noise of the observed measurement, and an explicit parameterized likelihood function to capture the generative process.

The advantage of specifying the model in terms of statistical distributions is that it's possible to 'sample' from any parameter, even in very complex models. This leads to the ability of estimating uncertainty in the model. Additionally, the incorporation of the prior knowledge about the parameters is used to reduce overfitting and apply constraints to the model.

There are a number of techniques that can be used for estimating the model parameters. For simple models it's possible to compute the posterior distribution analytically or sampling on a grid. Practically these techniques only work for the simplest of models so a smart sampling technique like Markov Chain Monte Carlo (MCMC) is employed. For sufficiently complex models sampling techniques like MCMC can be computationally intensive which is why this approach hasn't been widely adopted outside of academia until the last few years. MCMC and its variants like Hamiltonian Monte Carlo, Variational Inference, and Gibbs Sampling are all approaches that can be used as the Bayesian inference aspect of this technique.

Generalized Linear Model: The Generalized Linear Model (GLM) is a generic way of representing the process that generated some observed data. There are a number of advantages in using GLMs to solve the problem of estimating the probability of seeing an NDF outcome. A major advantage of using GLMs in a Bayesian framework is the ability to use a hierarchical (also called multi-level, random effects, mixed effects) model to represent the process that produces the observed outcome. A parameter in the linear model can in turn be treated as being produced by a linear combination of other variables. For example, a failure analysis could be modeled as having an NDF rate with mean of 20% and some non-zero variance. Alternatively, this value could be decomposed into a linear combination of NDF rates by workday where the parameters could say 0% mean NDF rate on Monday, Tuesday, Wednesday, Thursday, and a 100% mean NDF rate on Friday.

A GLM has 3 aspects: an exponential family probability distribution, a combination of linear predictors, and a link function, and can be represented as set forth in Equations 3 and 4:

$$y_i \sim Pr(\theta) \quad \text{Equation 3:}$$

$$f(\theta)=\alpha+\beta x \quad \text{Equation 4:}$$

Exponential Family Probability Distribution: In order to employ a GLM its first required that a distribution from the exponential family be chosen to represent the distribution over outcomes. This distribution is represented as 'Pr( )' in Equation 3 above. Linear models like linear regression traditionally use a Gaussian estimate for the estimation of the outcomes. Because the observed data is often distribution in a non-Gaussian manner, other distributions from the exponential family are used. The value 'θ' in Equation 3 represents the model parameters for the chosen distribution n.

For the specific case of predicting NDF outcomes the predicted observed variable is dichotomous: defect found or No Defect Found through the PFA process. This technique is not limited to dichotomous outcome variables, but since it's the most common and simple case it will be used to exemplify the technique. Alternatively, the NDF value can be represented as count data where the observed parameters are the number of attempted PFA tasks and the number of NDF results that occurred as part of those attempts. The observed NDF data is generally reported directly by the PFA lab in the form of historical data, but this is not a requirement for employing this technique. It's also possible to use an GLM and Bayesian inference predict an unknown outcome, a process called data imputation.

Combination of Linear Predictors: The GLM can employ a mixture of predictor types; for example, the predictors can be dichotomous, metric, nominal, and ordinal. The predictors are combined linearly in the form of Equation 5:

$$\mu_i=\alpha+\beta x_i \quad \text{Equation 5:}$$

where: i is an index for an individual outcome, μ is the central tendency of the prediction (for prediction with a Gaussian this would be the mean), x is a linear predictor value (this could be observed input data or latent priors on the value), and β is the relative importance of the predictor. The predictors x can be transformed prior to using them as independent variables in the generalized linear model. As an example, doubling the number of failure analysts that work in a fault analysis (FA) lab might not significantly impact the NDF rate, but increasing the number of analysts by an order of magnitude will. Hence the value supplied to the model x'=log(x). This value is still used in a linear model by simply performing a transformation to the independent variable during the model definition phase, and treating it as a linear variable in the model.

Any predictor can reasonably be included in a GLM for predicting an NDF outcome. Predictors that make the most sense in this context are things like historical NDF rates, results from scan diagnostics, results from memory bitmapping, PFA lab procedures, fab defectivity information, etc.

Link Function: Non-gaussian outcomes in a GLM require a link function to convert a linear model on the combination of linear predictors to the outcome. In the example of NDF data, the outcome is bounded on the lower end by 0 and on the upper end by 1. Traditionally a dichotomous outcome like NDF prediction will use a log it link function, but this proposal could apply to any link function. The choice of link function is decided by the combination of subject matter expertise and how well it can model the observed data.

Model Validation: It is critical to be able to trust a BGLM model enough to make real-world decisions based on its estimates. In order to quantify this trust the model should undergo a process known as Model Validation. For Bayesian analysis this model validation is often accomplished through the use of some type of information criterion. There are other ways to perform model validation as well, for example cross-validation, and this technique applies to any type of model validation. Along with using the model validation to estimate the power of the prediction, model validation can also be used to compare models. For example, it might make sense to compare models where one of the predictors is treated linearly, and another model where this predictor is log transformed.

Example Usage: The goal of the proposed PFA outcome prediction method is to predict the outcome in Physical Failure Analysis where the possible outcomes are "The failure analyst finds a visible defect in the integrated circuit" (PDF) or "The failure analyst does not have a successful outcome in the physical failure analysis job and no defect is identified" (non-PFD). The defect can be any type of anomaly in the integrated circuit such that the behavior or parameters are outside of the expectation of what is considered a good, working IC device. Commonly these types of defects are extra or missing material induced by an imperfect manufacturing process. Other types of defects include parametric issues that cause the IC not to work as specified in all of its timing, voltage, and temperature conditions.

In one embodiment, the parameters of each BGLM model are the number of Physical Failure Analysis cases attempted, $\eta$, and the unknown probability of an NDF result, $\rho_i$, for a given observed outcome $\gamma_i$ for IC i. For this type of count data, the probability distribution of the outcome can reasonably be modeled with a Binomial distribution. Mathematically this is shown as:

$$\gamma_i \sim \text{Binomial}(\eta, \rho_i) \quad \text{Equation 6:}$$

Because the ρ parameter in a Binomial probability function is bounded between 0 and 1 inclusive, a link function should be used to transform the output of the linear model into an appropriate parameter space. A common link function with this property is the log it function. Thus the parameter specific can be described as indicated by Equation 7:

$$\log\text{it}(\rho_i) = \alpha + \beta\gamma i \quad \text{Equation 7:}$$

An example of the using linear predictors can be had from two common outputs of scan diagnostics that are commonly associated with the observed rate of NDF: the scan diagnostic score 'ScanDiagnosticScore', and the count of unexplainable failing scan patterns 'NumUnexplainedPatterns' This can be represented according to Equation 8:

$$logit(\rho_i) = \alpha + \beta_{ScanDiagnosticScore} * x_{i,ScanDiagnosticScore} + \beta_{NumUnexplainedPatterns} * x_{i,NumUnexplainedPatterns} \quad \text{Equation 8}$$

The model is defined according to Equation 6 and Equation 7. This organization is traditionally considered to be a logistic regression model. Next the observed NDF data is supplied as the outcome variable y, and the predictor variables are supplied as input data x. With this setup, Bayesian inference is used to estimate the parameters of the model.

Figure 6:
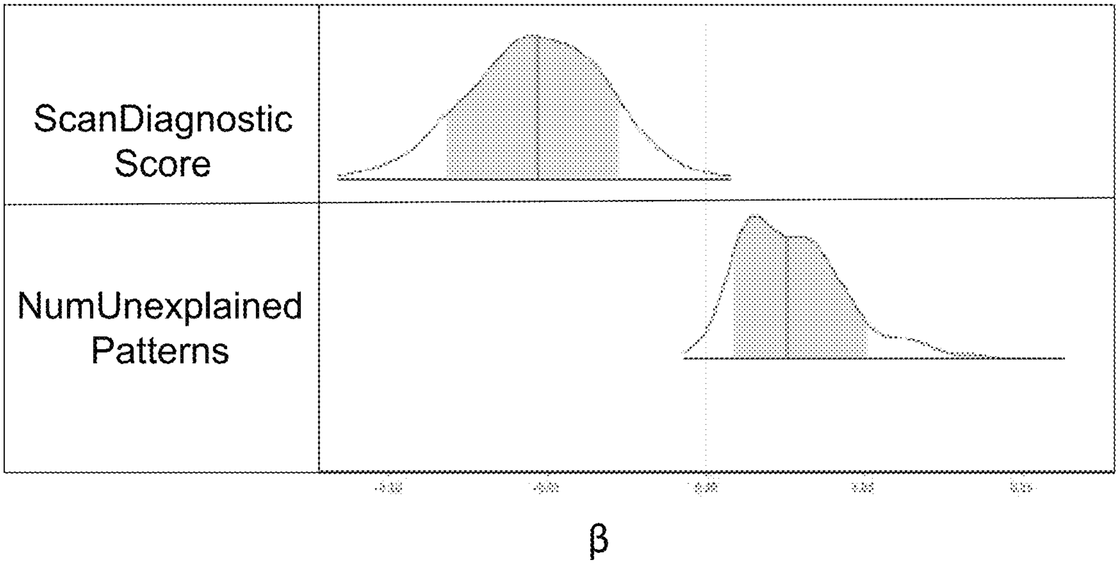
FIG. 6 is a diagram showing exemplary parameter distributions generated in accordance with the present invention.

Because the example model is a simple linear combination, the parameters of the predictors can be used to infer information about the process that generated the observed data. FIG. 6 shows exemplary β values that were inferred for the simple model. Intuitively they make sense based on an expert knowledge of the generative process. As the score decreases, the rate of NDF increases as evidenced by the negative value for $\beta_{ScanDiagnosticScore}$. Likewise, as the number of unexplained patterns increases so does the probability of an NDF outcome, as evidenced by the positive value for $\beta_{NumUnexplainedPatterns}$. Another important aspect of Bayesian inference is the ability to capture the uncertainty regarding the parameter estimation. The shaded regions of the probability distributions in FIG. 6 indicate the credible interval (the location of 80% certainty in the estimate). Note that there is less uncertainty regarding the predictor NumUnexplainedPatterns than there is regarding the effect of ScanDiagnsoticScore on the NDF outcome.

Figure 7:
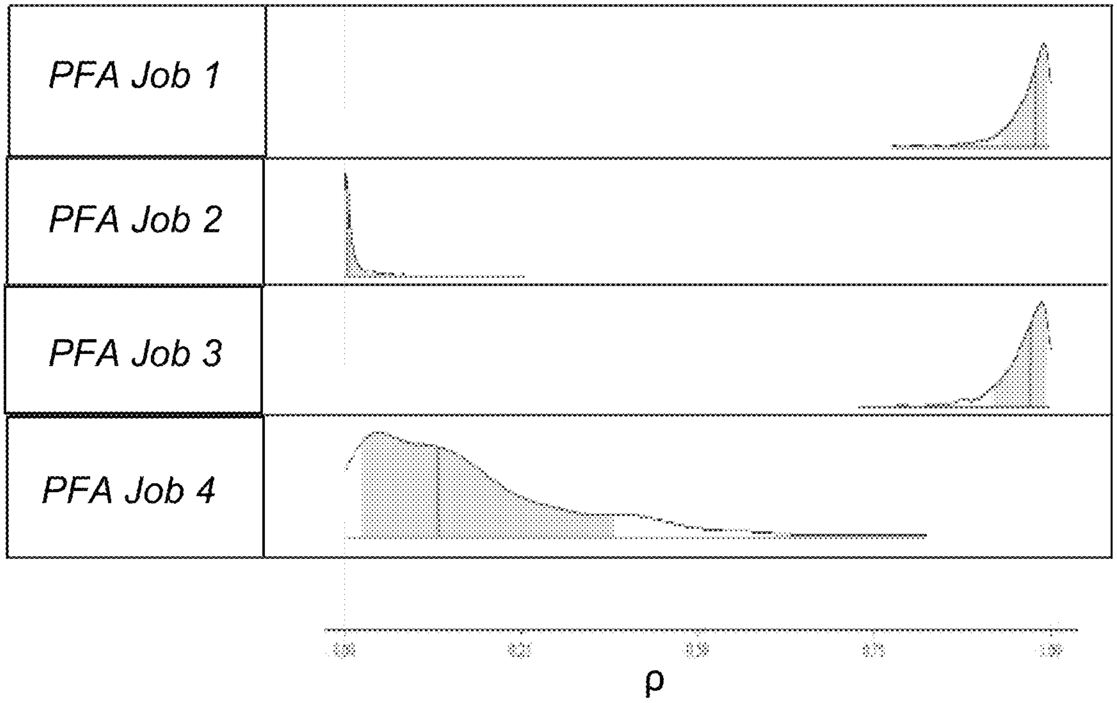
FIG. 7 is a diagram showing exemplary prediction distributions generated in accordance with the present invention.

In addition to making inferences about the parameters that describe the observed NDF results, it's also possible to infer probable outcomes given a model, the model parameters, and a new set of predictors (in this case ScanDiagnosticScore and NumUnexplainedPatterns). FIG. 7 shows four example estimations for the prediction parameter p of Equation 8. As discussed above, one of the main advantages of Bayesian inference is the ability to capture uncertainty in addition to reporting the best prediction. For example, in FIG. 7 the estimation for 'PFA Job 1' is around 17%, and the uncertainty bounds the estimate such that 80% of the uncertainty is between 13% and 23%. This means that this PFA has a high probability of a successful outcome. In contrast, 'PFA Job 4' is estimated to have an unsuccessful outcome with probability 62%. Therefore, given the choice between pursuing any of the four PFA jobs estimated below, it makes the most sense to proceed with PFA Job 1 and PFA Job 3.

Figure 8:
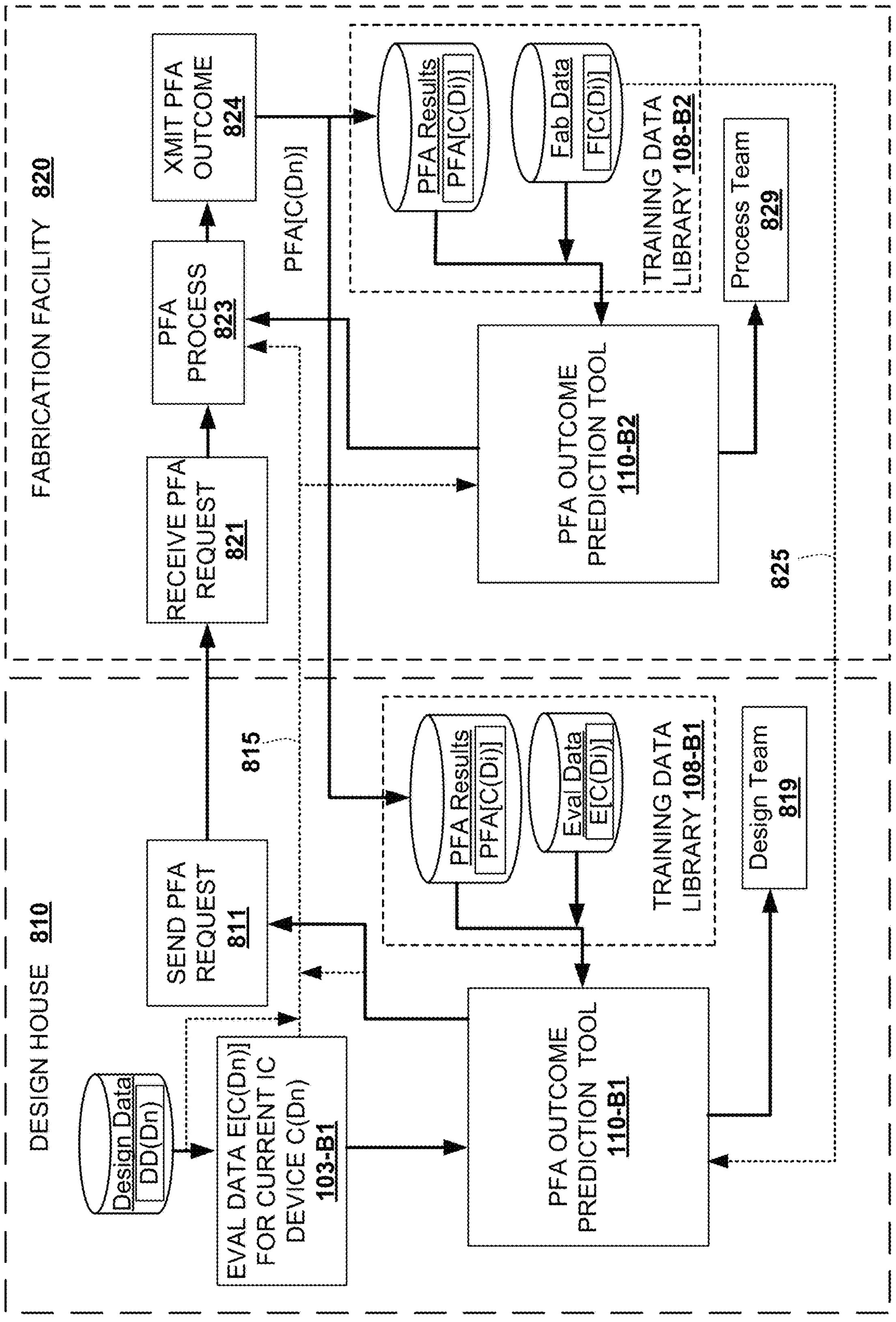
FIG. 8 is a flow diagram illustrating use of the PFA prediction tool methodology by both a design house and a fabrication facility according to another exemplary embodiment.

FIG. 8 is a simplified diagram depicting how aspects of the PFA outcome prediction methodology may be beneficially utilized by both a design house 810 and a fabrication facility (fab) 820, and possibly enhanced by additional data shared between design house 810 and fab 820.

Referring to the left side of FIG. 8, in the manner described above, design house 810 implements a first PFA outcome prediction tool 110-B1 (e.g., as part of an associated EDA tool) to generate a BGLM using previously-generated evaluation data (e.g., data E[C(Di)]) and historic PFA outcome (result) data (e.g., data PFA{E[C(Di)]}) stored in a training data library 108-B1, then utilizes the BGLM to generate a PFA outcome prediction for a current IC device C(Dn), and then either sends a PFA request (block 811) or forwards important parameters and/or design-based fault cause information to a design team (block 819). In one embodiment, proprietary design data DD(Dn), which may include timing marginalities, ATPG overkill data, and clock/power domain information associated with current IC device C(Dn), may also be utilized to generate the BGLM. According to an alternative embodiment, at least one of the PFA results generated by tool 110-B1, design data DD(Dn) and evaluation data E[C(Dn)] is securely communicated/transmitted to fab 820 (i.e., as indicated by dashed-line arrow 815) for use in improving the requested PFA process (i.e., by way of helping the PFA analyst isolate fault causes).

Referring to the right side of FIG. 8, upon receiving the PFA request (block 821) fab 820 performs the requested PFA process (block 823), then securely transmits PFA outcome data PFA[C(Dn)] back to design house 810 (block 824). In the manner described above, design house 810 subsequently updates library 810-B1 to include evaluation data E[C(Dn)] and PFA outcome data PFA[C(Dn)].

According to an optional embodiment of the present invention, fab 820 implements a second PFA outcome prediction tool 110-B2 using a training data library 108-B2 that contains fabrication facility data (fab data) F[C(Di)] for each PFA process and associated previously-generated PFA outcome data (PFA Results), which in one embodiment includes the same data PFA[C(Di)] that is sent to design house 810. In this instance, fab 820 generates its own PFA outcome predictions based on proprietary fab data F[C(Di)], and utilizes these PFA outcome predictions to further assist in performing the currently requested PFA process. In one example, proprietary fab data F[C(Di)] may include process equipment history including which manufacturing tool and which chamber in the tool was utilized during fabrication of IC device C(Dn). Sometimes a tool may have a fault that leads to defects in the manufactured IC. In this case there would be a strong prediction that PFA would find a defect if the predictor is a piece of equipment that has historically introduced manufacturing defects. In another example proprietary fab data F[C(Di)] may include PFA technique data used as a predictor. For example, assume a physical defect were affecting the fins in a FinFET process. If the PFA technique were only doing top-down inspection it would be unable to detect a defect which exists on the vertical aspect of a fin. If instead the PFA technique were top-down AND cross sectioning transistors the defect could be found. Hence the addition of cross-sectioning increases the PFA success rate and is a good predictor.

According to another optional embodiment, fab 820 may send fabrication data F[C(Di)] to design house 810 (e.g., as indicated by arrow 825), whereby the BGLM generation performed by design house 810 includes utilizing fabrication data F[C(Di)] that respectively operably characterizes one or more measured fabrication process parameters utilized during fabrication of corresponding IC devices, thereby allowing design house 810 to improve its PFA outcome prediction accuracy.

Technology Specific EDA System/Workflow Explanation

Figure 9:
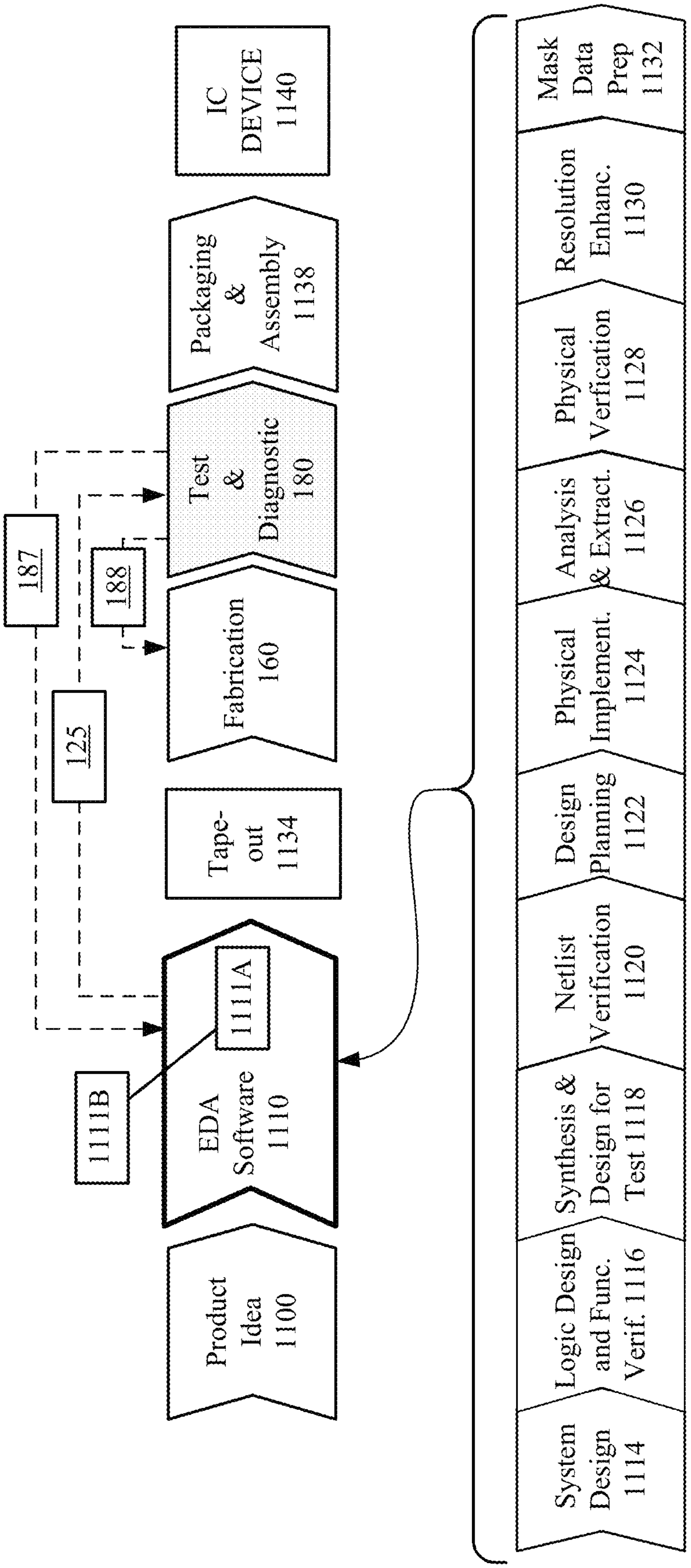
FIG. 9 is a flowchart illustrating various operations in the design and fabrication of an integrated circuit in accordance with an embodiment of the present disclosure.

FIG. 9 illustrates various processes performed in the design and fabrication of IC devices using EDA software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. A process ramp phase is performed when an initial circuit design is finalized, which typically includes tape-out of the initial circuit design (block 1134), fabrication of multiple IC devices on a semiconductor wafer (block 160) using an initial fabrication process based on a selected technology node, where each device being a physical implementation of the initial circuit design, and then test and diagnosis (block 180) of the IC devices. According to the present invention, the test and diagnosis process (block 180) is performed using the PFA outcome prediction method described above by way of comparing evaluation data measured from the fabricated IC devices with stored device-specific data (e.g., device corners 125) that are provided by the design house. Design-based faults 187 of the fabricated IC devices are then fed back to the design team and used to modify the circuit design, whereby the modified circuit design is then taped-out and resent to fabrication. Physical (fabrication-based) faults/failures 188 of the fabricated IC devices are fed back to the fabrication team and used to modify the initial fabrication process. As explained above, this process ramp phase is performed until a final circuit design and a final fabrication process produce IC devices that are free of faults/failures. The semiconductor wafers produced by the final fabrication process are then diced into individual chips, with each chip including one of the target IC devices, and then the chips are packaged and assembled using corresponding processes (block 1138), resulting in finished IC device 1140.

Note that the design process that uses EDA software tools (1110) includes operations 1114-1132, which are described below. This design flow description is for illustration purposes only and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products. In one embodiment, the machine-learning optimization tool/method described herein may be utilized during netlist verification.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products. In one embodiment, the machine-learning optimization tool/method described herein may be utilized during analysis and extraction.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules and Yield Explorer product. In one embodiment, the PFA outcome prediction method of the present invention is implemented as part of the Yield Explorer product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above-mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1110.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMs) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

Figure 10B:
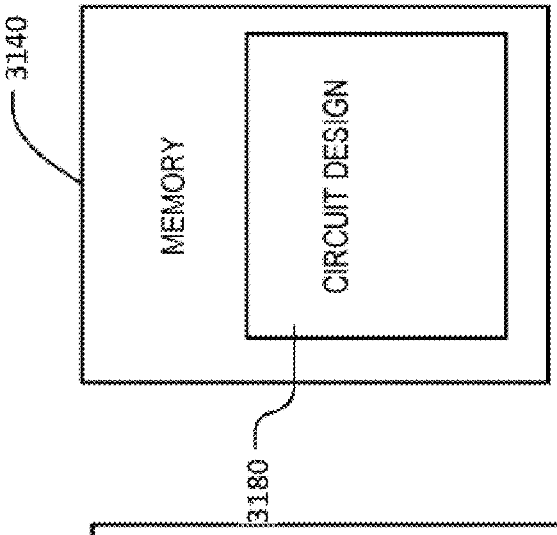
FIGS. 10A, 10B and 10C are simplified block diagrams of a computer system suitable for use with embodiments of the technology, as well as circuit design and circuit embodiments of the technology.
Figure 10C:
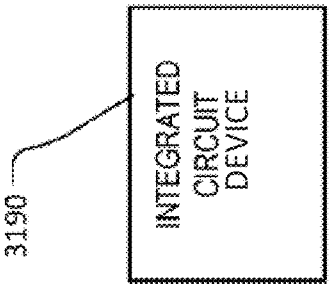
Figure 10A:
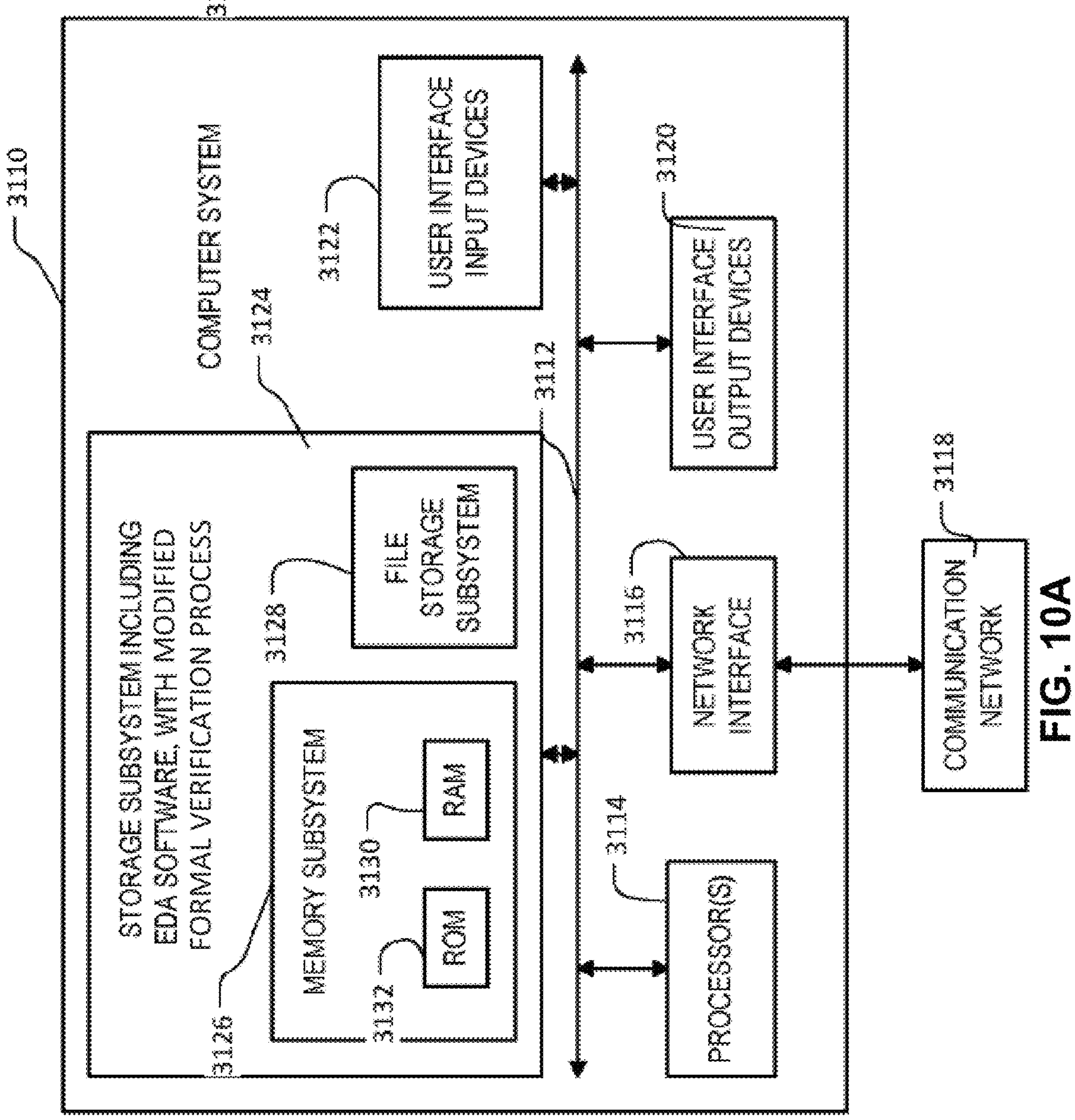

FIGS. 10A, 10B and 10C are simplified block diagrams of a computer system suitable for generating and verifying circuit designs. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. In one embodiment, RAM 3130 also serves to store the various tools, libraries and other data utilized during execution of the machine-learning optimization method described herein. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including the machine-learning optimization tools described herein, computer system 3110 depicted in FIG. 10A represents an electronic structure suitable for creating a circuit design. FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light). FIG. 10C is a block representing an IC 3190 designed and fabricated in accordance with the processes described above, where circuit 3190 is fabricated in accordance with the circuit design of data structure 3180 (see FIG. 10B).

The foregoing detailed description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. An electronic design automation (EDA) tool in a computer, the EDA tool including instructions that, when executed by a processor of said computer, cause the processor to perform operations comprising:

generating a Bayesian Generalized Linear Model using a training data library including a plurality of first training data entries, where each first training data entry includes corresponding first evaluation data that respectively operably characterizes one or more measured operating characteristics of a corresponding first integrated circuit chip, and corresponding first physical failure analysis result data that operably characterizes results of a corresponding physical failure analysis of said corresponding first integrated circuit chip; and utilizing the Bayesian Generalized Linear Model to generate a physical fault analysis (PFA) outcome prediction for a second evaluation data that operably characterizes said one or more measured operating characteristics of a corresponding second integrated circuit chip, wherein the PFA outcome prediction includes at least one of a posterior distribution and a credible interval, said posterior distribution being a portion of said Bayesian Generalized Linear Model corresponding to said second evaluation data, and said credible interval being a partial certainty region defined by the posterior distribution.

2. The EDA tool of claim 1, wherein generating the Bayesian Generalized Linear Model comprises forming a hierarchical model that utilizes said evaluation data and said associated PFA outcome data as a linear combination such that said Bayesian Generalized Linear Model provides a range of posterior distributions that vary as a function of said first evaluation data.

3. The EDA tool of claim 2, wherein utilizing the Bayesian Generalized Linear Model to generate said PFA outcome prediction comprises utilizing said second evaluation data to select said posterior distribution from said range of posterior distributions.

4. The EDA tool of claim 2, wherein utilizing the Bayesian Generalized Linear Model to generate said PFA outcome prediction further comprises calculating said credible interval using a predetermined portion of said posterior distribution.

5. The EDA tool of claim 1, wherein said operations further comprise updating said training data library to include both said a plurality of first training data entries and a second training data entry comprising said second evaluation data and a corresponding second physical failure analysis result data that operably characterizes results of a corresponding physical failure analysis of said corresponding said integrated circuit chip.

6. The EDA tool of claim 1, wherein utilizing the Bayesian Generalized Linear Model to generate said PFA outcome prediction further comprises performing a random draw from a Bernoulli distribution, wherein a rate parameter of the Bernoulli distribution is estimated with a logistic link function applied to the first evaluation data.

7. The EDA tool of claim 1, wherein utilizing the Bayesian Generalized Linear Model to generate said PFA outcome prediction further comprises utilizing a second training data library including said first physical failure analysis result data and corresponding fabrication data that respectively operably characterizes one or more measured fabrication process parameters utilized during fabrication of said corresponding first integrated circuit chip.

8. A method for generating a Physical Fault Analysis (PFA) outcome prediction for a selected integrated circuit device, said method being executed by a processor of a computer and comprising:

generating a Bayesian Generalized Linear Model using a training data library including a plurality of first training data entries, where each first training data entry includes corresponding first evaluation data that respectively operably characterizes one or more measured operating characteristics of a corresponding first integrated circuit device, and corresponding first physical failure analysis result data that operably characterizes results of a corresponding physical failure analysis of said corresponding first integrated circuit device; and utilizing the Bayesian Generalized Linear Model to generate said PFA outcome prediction for a second evaluation data that operably characterizes said one or more measured operating characteristics of said selected integrated circuit device, wherein the PFA outcome prediction includes at least one of a posterior distribution and a credible interval, said posterior distribution being a portion of said Bayesian Generalized Linear Model corresponding to said second evaluation data, and said credible interval being a partial certainty region defined by the posterior distribution.

9. The method of claim 8, wherein generating the Bayesian Generalized Linear Model comprises forming a hierarchical model that utilizes said evaluation data and said associated PFA outcome data as a linear combination such that said Bayesian Generalized Linear Model provides a range of posterior distributions that vary as a function of said first evaluation data.

10. The method of claim 9, wherein utilizing the Bayesian Generalized Linear Model to generate said PFA outcome prediction comprises utilizing said second evaluation data to select said posterior distribution from said range of posterior distributions.

11. The method of claim 9, wherein utilizing the Bayesian Generalized Linear Model to generate said PFA outcome prediction further comprises calculating said credible interval using a predetermined portion of said posterior distribution.

12. The method of claim 8, wherein said method further comprises updating said training data library to include both said a plurality of first training data entries and a second training data entry comprising said second evaluation data and a corresponding second physical failure analysis result data that operably characterizes results of a corresponding physical failure analysis of said corresponding said integrated circuit device.

13. The method of claim 8, wherein utilizing the Bayesian Generalized Linear Model to generate said PFA outcome prediction further comprises performing a random draw from a Bernoulli distribution, wherein a rate parameter of the Bernoulli distribution is estimated with a logistic link function applied to the first evaluation data.

14. The method of claim 8, wherein utilizing the Bayesian Generalized Linear Model to generate said PFA outcome prediction further comprises utilizing a second training data library including said first physical failure analysis result data and corresponding fabrication data that respectively operably characterizes one or more measured fabrication process parameters utilized during fabrication of said corresponding first integrated circuit device.

15. A non-transitory computer readable medium comprising stored instructions, which when executed by a processor, cause the processor to:

generate a Bayesian Generalized Linear Model using a training data library including a plurality of first training data entries, where each first training data entry includes corresponding first evaluation data that respectively operably characterizes one or more measured operating characteristics of a corresponding first integrated circuit chip, and corresponding first physical failure analysis result data that operably characterizes results of a corresponding physical failure analysis of said corresponding first integrated circuit chip; and utilize the Bayesian Generalized Linear Model to generate a physical fault analysis (PFA) outcome prediction for a second evaluation data that operably characterizes said one or more measured operating characteristics of a corresponding second integrated circuit chip, wherein the PFA outcome prediction includes at least one of a posterior distribution and a credible interval, said posterior distribution being a portion of said Bayesian Generalized Linear Model corresponding to said second evaluation data, and said credible interval being a partial certainty region defined by the posterior distribution.

16. The non-transitory computer readable medium of claim 15, wherein generating the Bayesian Generalized Linear Model comprises forming a hierarchical model that utilizes said evaluation data and said associated PFA outcome data as a linear combination such that said Bayesian Generalized Linear Model provides a range of posterior distributions that vary as a function of said first evaluation data.

17. The non-transitory computer readable medium of claim 16, wherein utilizing the Bayesian Generalized Linear Model to generate said PFA outcome prediction comprises utilizing said second evaluation data to select said posterior distribution from said range of posterior distributions.

18. The non-transitory computer readable medium of claim 16, wherein utilizing the Bayesian Generalized Linear Model to generate said PFA outcome prediction further comprises calculating said credible interval using a predetermined portion of said posterior distribution.

19. The non-transitory computer readable medium of claim 15, wherein said operations further comprise updating said training data library to include both said a plurality of first training data entries and a second training data entry comprising said second evaluation data and a corresponding second physical failure analysis result data that operably characterizes results of a corresponding physical failure analysis of said corresponding said integrated circuit chip.

20. The non-transitory computer readable medium of claim 15, wherein utilizing the Bayesian Generalized Linear Model to generate said PFA outcome prediction further comprises performing a random draw from a Bernoulli distribution, wherein a rate parameter of the Bernoulli distribution is estimated with a logistic link function applied to the first evaluation data.

* * * * *